(12) United States Patent
Epifano

(10) Patent No.: US 8,625,714 B2
(45) Date of Patent: Jan. 7, 2014

(54) TIME DELAY ESTIMATION

(75) Inventor: Fabio Epifano, Segny (FR)

(73) Assignee: ST-Ericsson SA, Plan-les-Ouates (CH)

( * ) Notice: Subject to any disclaimer, the term of this patent is extended or adjusted under 35 U.S.C. 154(b) by 104 days.

(21) Appl. No.: 13/276,598

(22) Filed: Oct. 19, 2011

(65) Prior Publication Data

US 2012/0287980 A1 Nov. 15, 2012

Related U.S. Application Data

(60) Provisional application No. 61/485,230, filed on May 12, 2011.

(51) Int. Cl.
*H04K 1/02* (2006.01)
*H04L 25/03* (2006.01)
*H04L 25/49* (2006.01)

(52) U.S. Cl.
USPC ............................ 375/296; 375/295; 375/224

(58) Field of Classification Search
USPC ......... 375/224, 228, 259–260, 285, 295–296, 375/298, 377
See application file for complete search history.

(56) References Cited

U.S. PATENT DOCUMENTS

| | | | | |
|---|---|---|---|---|
| 6,665,351 | B2 * | 12/2003 | Hedberg | 375/296 |
| 2004/0233785 | A1 * | 11/2004 | Szajnowski | 367/124 |
| 2006/0067426 | A1 | 3/2006 | Zolfaghari et al. | |
| 2006/0280032 | A1 * | 12/2006 | Szajnowski | 367/124 |
| 2009/0285330 | A1 | 11/2009 | Premakanthan et al. | |
| 2010/0054367 | A1 * | 3/2010 | Gorday | 375/324 |
| 2010/0081389 | A1 * | 4/2010 | Lawrow et al. | 455/67.11 |
| 2010/0231437 | A1 * | 9/2010 | Szajnowski | 342/118 |

FOREIGN PATENT DOCUMENTS

EP 2 221 629 A1 8/2010

OTHER PUBLICATIONS

Faulkner, M. et al. "Adaptive Linearization Using Predistortion-Experimental Results" IEEE Transactions on Vehicular Technology, vol. 43, No. 2, May 1994, pp. 323-332.
Cavers, J. "Amplifier Linearization Using a Digital Predistorter with Fast Adaptation and Low Memory Requirements" IEEE Transactions on Vehicular Technology, vol. 39, No. 4, Nov. 1990, pp. 374-382.

* cited by examiner

*Primary Examiner* — Jean B Corrielus
(74) *Attorney, Agent, or Firm* — Potomac Patent Group PLLC; Kenneth B. Leffler

(57) ABSTRACT

An amount of delay between a digital reference signal and a digital derived signal is measured, wherein the derived signal is derived from the reference signal. Measurement involves ascertaining a sign of a slope of the derived signal over a first time interval and producing a set of time-associated reference signs by ascertaining a sign of a slope of the reference signal over each of a plurality of different time intervals leading up to the first time interval. A first set of coincidence results is produced by detecting coincidence between the sign of the slope of the derived signal and each one of the time-associated reference signs in the set of time-associated reference signs. The first set of coincidence results is used alone or in combination with other coincidence results as an indicator of the amount of delay between the reference signal and the derived signal.

36 Claims, 12 Drawing Sheets

TIME DELAY ESTIMATION

CROSS REFERENCE TO RELATED APPLICATIONS

This application claims the benefit of U.S. Provisional Application No. 61/485,230, filed May 12, 2011, which is hereby incorporated herein by reference in its entirety.

BACKGROUND

The invention relates to the measurement and, in some circumstances, compensation of a signal delay introduced by circuitry, such as between reference signals and feed-back signals in a closed-loop configuration of electronic circuitry such as, but not limited to, radio transmitters.

There is often a need to estimate an amount of delay introduced by circuitry. Taking modern wireless transmitters as one of many possible examples (e.g., wireless transmitters in mobile phones, or in computers with built-in transceivers) knowledge of the transmitter's delay (i.e., between input and output) may be an integral part of techniques applied to make any of a number of types of measurements in a closed-loop configuration. Different types of measurements can be made with such a configuration, such as (without limitation):
1. Transmitter Power measurement
2. Transmitter Gain measurement (fast power measurement)
3. Transmitter Phase measurement
4. Transmitter IQ Mismatches (i.e., mismatches between amplitude and/or phase of an In-phase and Quadrature-phase signal pair)
5. Transmitter Adaptive Digital Pre-distortion It is very important that an accurate measurement of the delay ("loop-back delay") be made. The feed-back signal, herein referred to as SFB(t), is a delayed but accurate copy of the base-band transmitted signal. This delay will vary with process, transmitter settings, temperature, and the like.

The loop-back delay can severely degrade the closed-loop measurement if not compensated for. This is especially so in those algorithms that operate on a sample-by-sample basis.

Because the loop-back delay is not known a-priori with sufficient accuracy, a calibration algorithm is required.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

As the feed-back signal is an accurate copy of the transmitted signal, the two signals will be highly correlated when properly aligned. An aspect of exemplary embodiments consistent with the invention is the extraction of delay information merely by comparing the amount of coincidence between the polarity of the feed-back signals envelope slopes with the polarity of the envelope slopes of each of a set of delayed copies of the transmitter (e.g., input) signal.

In accordance with one aspect of the present invention, the foregoing and other objects are achieved in methods and apparatuses for measuring an amount of delay between a digital reference signal and a digital derived signal, wherein the derived signal is derived from the reference signal. Measurement comprises ascertaining a sign of a slope of the derived signal over a first time interval and producing a set of time-associated reference signs by ascertaining a sign of a slope of the reference signal over each of a plurality of different time intervals leading up to the first time interval. A first set of coincidence results is produced by detecting coincidence between the sign of the slope of the derived signal and each one of the time-associated reference signs in the set of time-associated reference signs. The first set of coincidence results is used alone or in combination with other coincidence results as an indicator of the amount of delay between the reference signal and the derived signal.

In some but not necessarily all embodiments, measuring the delay comprises producing one or more additional sets of coincidence results by performing, for each one of one or more different time intervals:
 ascertaining a sign of a slope of the derived signal over the different time interval; and
 producing an additional set of time-associated reference signs by ascertaining a sign of a slope of the reference signal over each of a plurality of different time intervals leading up to the different time interval,
wherein using the first set of coincidence results alone or in combination with other coincidence results as the indicator of the amount of delay between the reference signal and the derived signal comprises using the first set of coincidence results in combination with the one or more additional sets of coincidence results as the indicator of the amount of delay between the reference signal and the derived signal.

In some but not necessarily all of the embodiments that comprise producing one or more additional sets of coincidence, using the first set of coincidence results in combination with the one or more additional sets of coincidence results as the indicator of the amount of delay between the reference signal and the derived signal comprises combining each coincidence result in the first set of coincidence results with a respective one of the coincidence results from each of the one or more additional sets of coincidence results to produce a combined set of coincidence results. The combined set of coincidence results is then used as the indicator of the amount of delay between the reference signal and the derived signal.

In some, but not necessarily all, of these embodiments, using the combined set of coincidence results as the indicator of the amount of delay between the reference signal and the derived signal comprises identifying which element of the combined set of coincidence results has a minimum value; and using the identified element's position within the combined set of coincidence results as an indicator of the amount of delay between the digital reference signal and the digital derived signal.

In some but not necessarily all embodiments, using the first set of coincidence results alone or in combination with other coincidence results as the indicator of the amount of delay between the reference signal and the derived signal comprises identifying which element of the first set of coincidence results has a minimum value. The identified element's position within the first set of coincidence results is then used as an indicator of the amount of delay between the digital reference signal and the digital derived signal.

In some but not necessarily all embodiments, producing the set of time-associated reference signs by ascertaining the sign of the slope of the reference signal over each of the plurality of different time intervals leading up to the first time interval comprises supplying the sign of the slope of the reference signal associated with the first time interval to an input port of a bank of N series-connected delay units and clocking the bank of delay units at a known clock rate, wherein N is greater than 1. In some of these embodiments, producing the first set of coincidence results by detecting coincidence between the sign of the slope of the derived signal and each one of the time-associated reference signs in the set of time-associated reference signs comprises supplying an output of each delay unit within the bank of delay units to one input of a respective one of a plurality of comparison units; and supplying the sign of the slope of the derived signal to another input of each of the plurality of comparison units. One or more of the comparison units can be, for example, XOR gates. In other variations of these embodiments, using the first set of coincidence results alone or in combination with other coincidence results as the indicator of the amount of delay between the reference signal and the derived signal comprises supplying an output of each of the comparison units to a respective one of a plurality of counters; clocking each of the counters at the known clock rate; and ascertaining which of the counters is storing a lowest count value.

In some but not necessarily all embodiments, the digital reference signal is a baseband signal that is supplied for use by a radio transmitter; and the digital derived signal is produced by producing in-phase and quadrature phase digital baseband output signals from a radiofrequency signal that is present at an output port of the radio transmitter. The output port can be, for example, an antenna.

In some but not necessarily all alternatives, ascertaining the sign of the slope of the derived signal over the first time interval comprises squaring an envelope of the in-phase and quadrature phase digital baseband output signals; obtaining a difference value by subtracting the squared envelope of the in-phase and quadrature phase digital baseband output signals from an earlier-obtained squared envelope of the in-phase and quadrature phase digital baseband output signals; and ascertaining the sign of the difference value.

In yet some other possible alternatives, the digital reference signal is supplied to an input port of a reference signal delay unit, wherein the reference signal delay unit supplies a delayed reference signal at an output port. The amount of delay between the digital reference signal and the digital derived signal is used to control the reference signal delay unit. The delayed reference signal is compared to the digital derived signal, and a result of the comparison is used to control an aspect of the radio transmitter operation. In some but not necessarily all of these embodiments, using the result of the comparison to control the aspect of the radio transmitter operation includes controlling predistortion that is applied to the radio transmitter's input signal.

In some but not necessarily all embodiments, the derived signal comprises an in-phase signal and a quadrature phase signal, and ascertaining the sign of the slope of the derived signal over the first time interval comprises generating an envelope signal (or alternatively a squared envelope signal) from the in-phase and quadrature phase signals; ascertaining a difference between a first sample of the envelope signal (or squared envelope signal) and a second sample of the envelope signal (or squared envelope signal), wherein the first sample of the envelope signal (or squared envelope signal) occurs at a beginning of the first time interval and the second sample of the envelope signal (or squared envelope signal) occurs at an end of the first time interval; and ascertaining a sign of the difference between the first sample of the envelope signal (or squared envelope signal) and the second sample of the envelope signal (or squared envelope signal). In some but not necessarily all of these embodiments, the first sample of the envelope signal (or squared envelope signal) and the second sample of the envelope signal (or squared envelope signal) are adjacent samples of the envelope signal (or squared envelope signal).

BRIEF DESCRIPTION OF THE DRAWINGS

The objects and advantages of the invention will be understood by reading the following detailed description in conjunction with the drawings in which.

DETAILED DESCRIPTION

Figure 1:
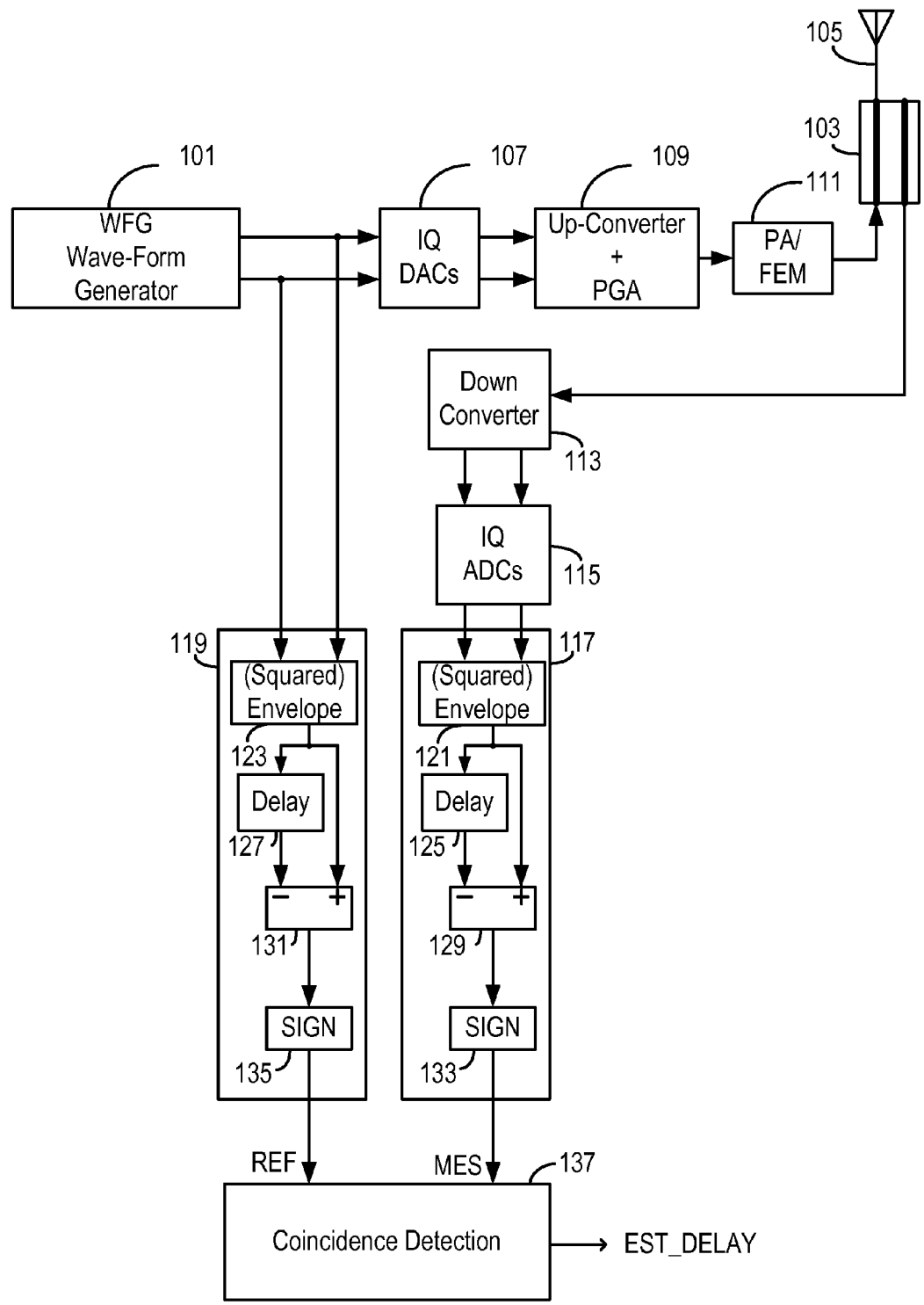
FIG. 1 illustrates a transmitter having a closed-loop configuration that includes a delay unit (in addition to other circuit elements—not shown) for estimating a delay amount between an input signal and an output signal of the transmitter.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., analog and/or discrete logic gates interconnected to perform a specialized function), by one or more processors programmed with a suitable set of instructions, or by a combination of both. The term "circuitry configured to" perform one or more described actions is used herein to refer to any such embodiment (i.e., one or more specialized circuits and/or one or more programmed processors). Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments as described above may be referred to herein as "logic configured to" perform a described action, or alternatively as "logic that" performs a described action.

FIG. 1 illustrates a transmitter having a closed-loop configuration that includes an exemplary embodiment of a delay estimator that is consistent with the invention. The delay estimator estimates an amount of delay between an input signal supplied by a wave-form generator 101 and an output signal detected, by suitable detection means 103, at an antenna 105 of the transmitter. In the forward path of the transmitter, the wave-form generator 101 generates in-phase (I) and quadrature phase (Q) signals and supplies these to a pair of digital-to-analog converters (IQ DACs) 107. The pair of analog signals generated by the IQ DACs 107 are up-converted to radio frequency and mixed into a single analog signal by up-converter and programmable gain amplifier (PGA) circuitry 109. The radio frequency signal is then transformed into a signal that is suitable for transmission from the antenna 105 by a power amplifier front end module (PA FEM) 111.

In the feedback path, the signal detected at the antenna 105 is down converted to baseband frequency by down conversion circuitry 113, which supplies separate I and Q signals, in analog form, at its output. The analog I and Q signals are converted into a pair of digital I and Q signals by analog-to-digital converters (IQ ADCs) 115. These digital I and Q signals are herein referred to as the signal to be measured ("MES") (as compared with the original signal generated by the waveform generator 101, which is the "reference signal"—"REF").

The polarity of the slope of the signal to be measured is generated by slope polarity circuitry 117. Similarly, the polarity of the slope of the reference signal is generated by slope polarity circuitry 119. Each of the slope polarity circuitry 117, 119 operates by first ascertaining, in some embodiments, the squared envelope ($I^2+Q^2$) of the supplied signal, and in alternative embodiments the (non-squared) envelope ($\sqrt{I^2+Q^2}$) of the supplied signal, by a respective one of (squared) envelope circuitry 121, 123. In yet alternative embodiments not using I and Q signals, it is still desired to obtain a (squared) envelope of the signal to be measured. Means for obtaining the (squared) envelope in such cases can be embodied as, for example, a power detector. The (squared) envelope is used in order to remove phase information from the supplied signal. Then, the slope of the squared signal is found by subtracting the signal from a delayed version of itself (delaying of the signal being performed by a respective one of delay units 125, 127, and subtraction being performed by a respective one of subtractors 129, 131). The signal and its delayed version thereby define a first time interval, wherein the word "first" is not used to mean in a chronological sense, but rather is used to distinguish the time interval from other, different time intervals. The signal and its delayed version may, in practice, be adjacent samples of the squared envelope signal, although this is not necessarily the case in all embodiments. The signs of the resulting differences are found by respective ones of sign-determining circuitry 133, 135 and these are supplied at the respective outputs of the slope polarity circuitry 117, 119.

The respective slope polarities of the signal to be measured and the reference signal are supplied to coincidence detection circuitry 137. The coincidence detection circuitry 137 extracts (or estimates) the delay information by comparing the amount of coincidence between the polarity of the feedback signals (squared) envelope slopes with the polarity of the (squared) envelope slopes of each of a set of delayed copies of the transmitter (e.g., input) signal.

In practice, the feed-back path should be highly linear in order to allow for accurate measurements of the output signal to be made.

Figure 2:
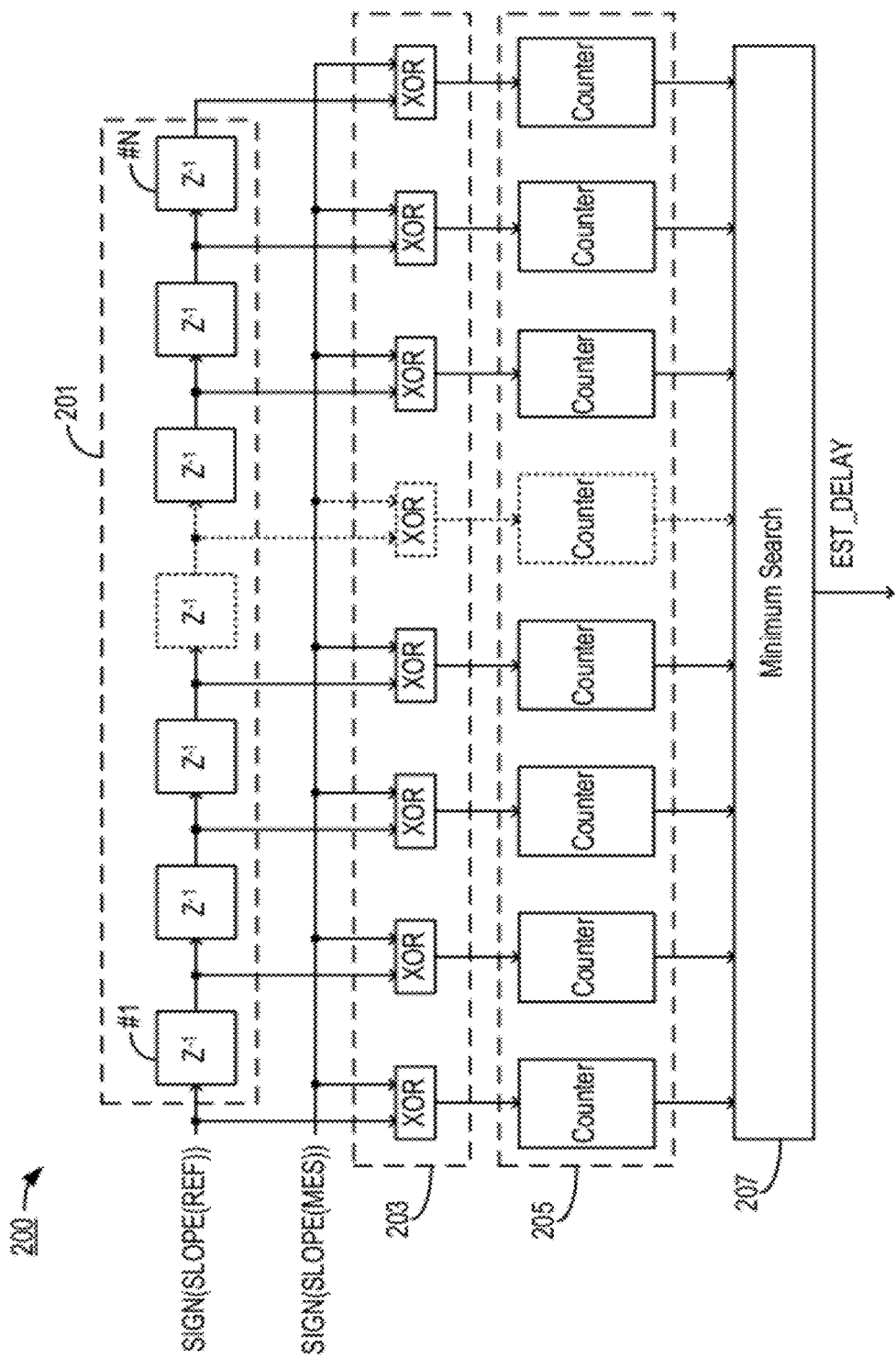
FIG. 2 is a block diagram of an exemplary embodiment of a delay estimator consistent with the invention.

FIG. 2 is a block diagram of an exemplary embodiment of coincidence detection circuitry 200. The coincidence detection circuitry 200 comprises a bank of N 1-bit delay units 201 that receives the sign of the slopes of the squared reference signal envelope and delays it by up to N delay times, wherein in this exemplary embodiment, each delay time is one sample clock period. This need not be the case in all embodiments. The output of each delay unit within the bank of delay units 201 is tapped and supplied to one input of a respective one of N comparison units. In the exemplary embodiment, the N comparison units are a bank of N XOR gates 203.

XOR gates have the property of outputting a binary "0" when its inputs are equal to one another, and a binary "1" otherwise. In the coincidence detection circuitry 200, each of the XOR gates within the bank of N XOR gates 203 receives, as its other input, the signal to be measured. Accordingly, the output of each XOR gates is equal to a binary "1" whenever the 1-bit sign of the slope of the signal to be measured is not equal to the sign of the slope of a delayed version of the reference signal.

Each XOR gate within the bank of N XOR gates 203 supplies its output to a respective one of N counters (accumulators) within a bank of N counters 205. Over time, each of the counters outputs a value that represents the degree to which the correspondingly delayed reference signal does not match the signal to be measured. It is therefore desired to identify that counter whose output is the lowest among all counter output values, since this counter corresponds to the delay amount having the highest level of correspondence between the correspondingly delayed reference signal and the signal to be measured. Minimum search circuitry 207 is therefore included that receives each of the counter output values from the bank of N counters 205, and outputs a value indicating which of the counters supplied the lowest value. That value corresponds to the estimated delay amount, and the actual delay amount can be obtained by, for example in some but not necessarily all embodiments, multiplying the counter number by the known amount of delay introduced by each delay unit within the bank of N delay units 201.

Figure 3:
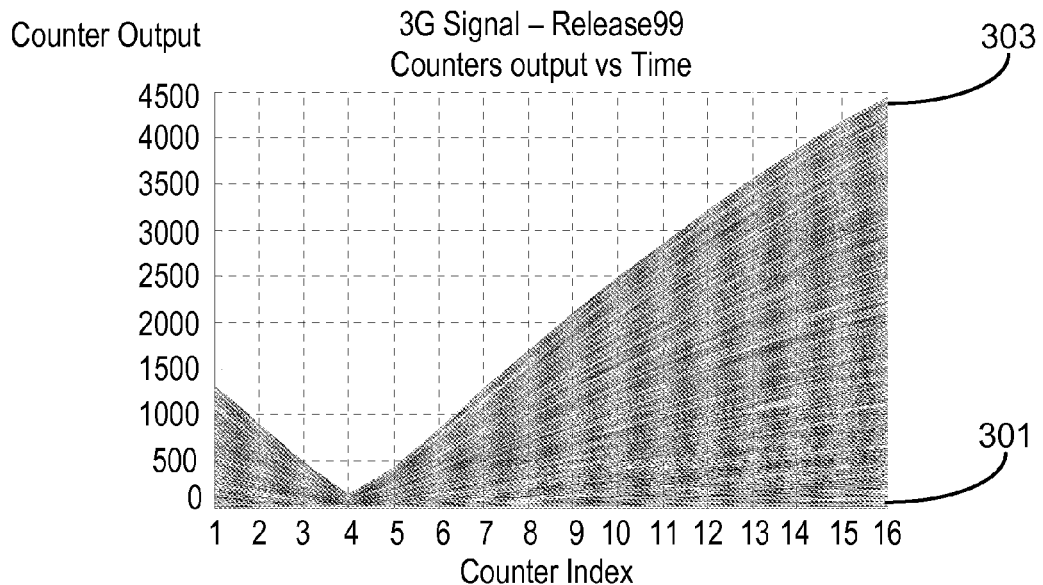
FIG. 3 is a set of graphs of counter output as a function of counter index for an example in which 3G Signal—Release99 signals are used and in which the delay amount is equal to "4".
Figure 4:
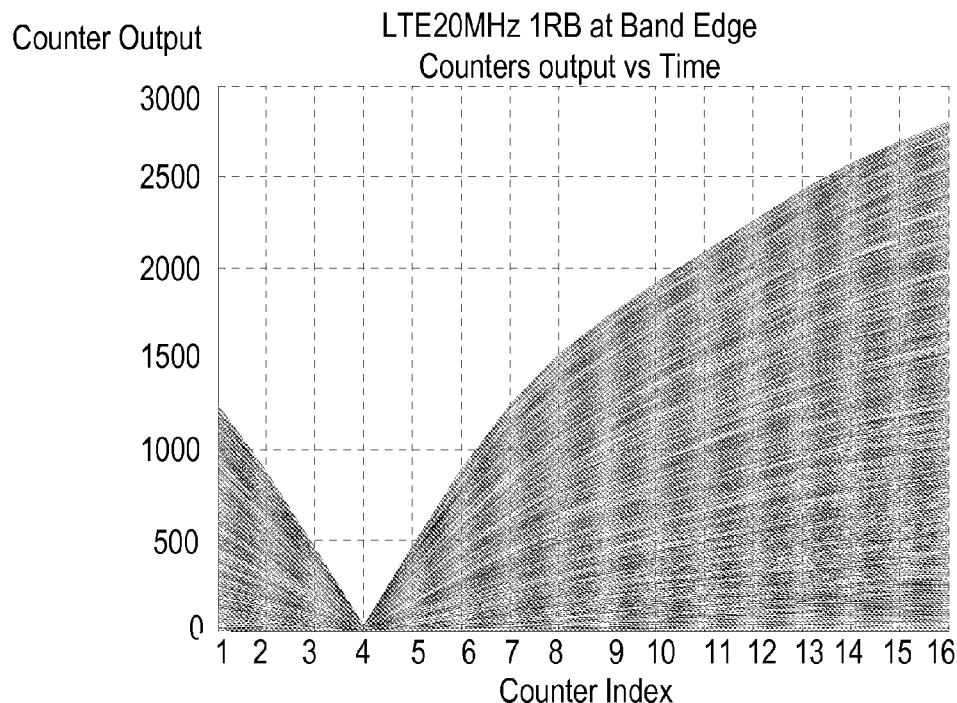
FIG. 4 is a set of graphs of counter output as a function of counter index for an example in which LTE 20 MHz 1 Resource Block (RB) at the band edge signals are used and in which the delay amount is equal to "4".

An aspect of embodiments such as those described above is that the longer the counters operate, the more confidence one has in the delay estimate. This can be seen, for example, in FIG. 3, which is a set of graphs of counter output as a function of counter index for an example in which 3G Signal—Release99 signals are used and in which the delay amount is equal to "4". It can be seen that, when a relatively low number of comparisons are made (e.g., see the graph 301), the difference between the minimum count and the maximum count is relatively small, whereas when a relatively large number of comparisons are made (e.g., see the graph 303), the difference between the minimum count and the maximum count is quite large, instilling high confidence in the decision that counter 4 corresponds to the correct delay amount. A similar characteristic can be seen in FIG. 4, which is a set of graphs of counter output as a function of counter index for an example in which LTE 20 MHz 1 Resource Block (RB) at the band edge signals are used and in which the delay amount is equal to "4".

The various exemplary embodiments described above provide advantages over conventional time delay estimation techniques. For example, some embodiments can exhibit one or more of the following:

Insensitivity to RF Phase misalignment
Simplicity with respect to hardware implementation
Lack of any requirement for a specific test signal.

To further illustrate aspects and advantages of the various inventive concepts, a transmitter will know be described that employs a time delay estimator, such as those described above, for the purpose of measuring distortion of a signal supplied to the transmitter's antenna (the distortion being introduced by the transmitter circuitry itself), and using this measurement to adaptively predistort the supplied baseband signal to compensate for the distortion, thereby substantially eliminating it. A full discussion follows in order to ensure the reader's understanding of all aspects.

Figure 5:
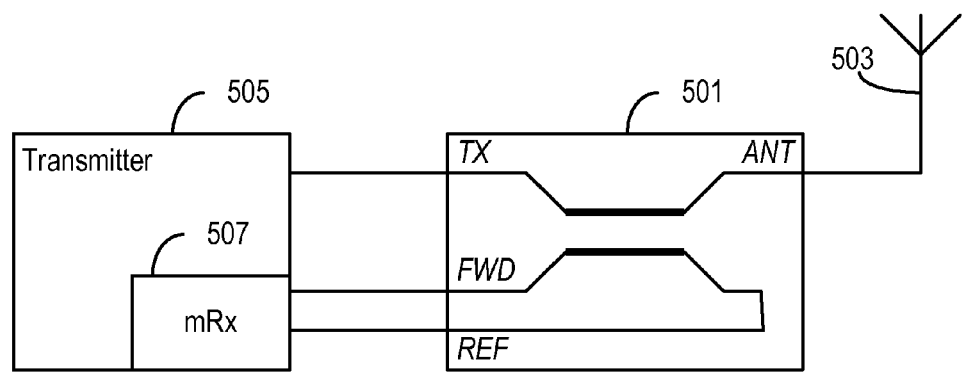
FIG. 5 is a block diagram of a transmitter arrangement.

State-of the-art transceivers use a dedicated receiver to perform measurement of the transmitted signal. As shown in FIG. 5, which is a block diagram of a transmitter arrangement, a bi-directional coupler 501 can be used to obtain a copy of the signal that is either transmitted to or reflected from the antenna 503.

The transmitter 505 (TX) performs:
The digital-to-analogue conversion followed by a reconstruction filtering of (ITX, QTX) signals provided by DFE
The up-conversion to RF frequency followed by an amplifier to the desired power level.
A measurement receiver (mRx) 507 associated with the transmitter 505 performs
The down-conversion to baseband frequency followed by an anti-aliasing filtering; and
The analogue to-digital conversion providing (ImRX, QmRX) to the Digital Front End (DFE).

In order to improve the transmitter efficiency, the digital baseband transmit signal can be predistorted to compensate for the RF power amplifier (PA) non-linearity.

Non-linearity of an RF power amplifier can be of two types: AM-AM (Amplitude Modulation to Amplitude Modulation) and AM-PM (Amplitude Modulation to Phase Modulation).

In practice, AM-AM distortion is a variable gain that only depends on the input envelope (AM) and AM-PM distortion is a non-constant phase that only depends on the input envelope (AM).

Figure 6:
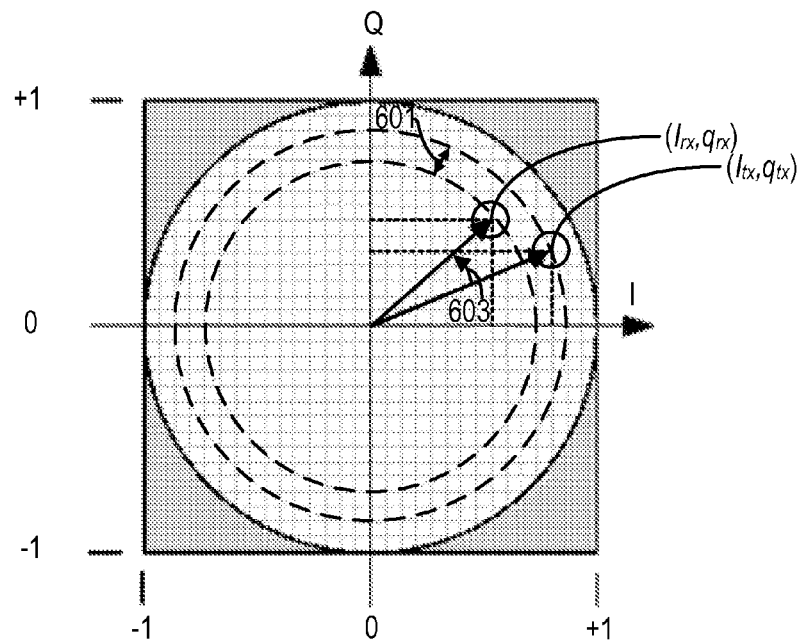
FIG. 6 is a graph illustrating an amplitude distortion and a phase distortion between a transmitted signal point (itx,qtx) and the signal as it appears at the antenna (itx,qtx).

If the input signal can be expressed as follows:

$$s_{IN}(t) = \rho_{IN}(t) \cdot e^{j \cdot \theta_{IN}(t)}$$

then, the power amplifier output signal is:

$$s_{OUT}(t) = G_{AM}(\rho_{IN}(t)) \cdot \rho_{IN}(t) \cdot e^{j \cdot (\theta_{IN}(t) + \theta_{PM}(\rho_{IN}(t)))}$$

where the power amplifier gain and phase are functions of the input envelope. FIG. 6 is a graph illustrating an amplitude distortion 601 and a phase distortion 603 between a transmitted signal point $(i_{tx}, q_{tx})$ and the signal as it appears at the antenna $(i_{rx}, q_{rx})$.

Static pre-distortion is based on a pre-known predistortion function that will depend on power amplifier temperature and supply voltage. The predistortion function(s) is(are) stored in a memory.

Adaptive predistortion is based on a continuously updated function that avoids requiring a large memory. However, conventional adaptive predistortion algorithms are fundamentally based on (1) pre-defined test-signals (single-tone or multi-tones), (2) precise measurements and (3) complex computation to get the gain and phase correction.

Conventional adaptive predistortion algorithms therefore present undesirable characteristics. In principle if one wants to simultaneously correct both the gain and the phase for a given AM value, a complex division needs to be computed between the reference transmit signal and the measured feedback signal once it has been well averaged to remove the noise. This implies a long latency in the correction making the algorithm unfeasible during normal operation of the telephone (e.g., use outside of production testing and/or calibration).

This draw-back has been the reason why adaptive predistortion techniques are mainly used to get the predistortion values during production calibration.

The inventor of the subject matter described herein has recognized that improved predistortion methods and apparatuses can be obtained by basing them on an iterative approach that uses each digital base-band sample to detect the presence of non-linearity in the received signal. The non-linearity detection allows correcting the AM-AM and AM-PM compensation values by a predefined quantity. The non-linearity detector provides only the information about the direction of the correction, with that information being used to correspondingly increase or decrease the actual compensation values. To detect the non-linearity, a time alignment function is required to align the transmit signal and the received one so that they can be meaningfully compared. Time alignment requires knowledge of the amount by which the received signal is a delayed version of the transmitted signal. The time delay estimation methods and apparatuses described above are preferably used to determine the amount of time delay.

Figure 7:
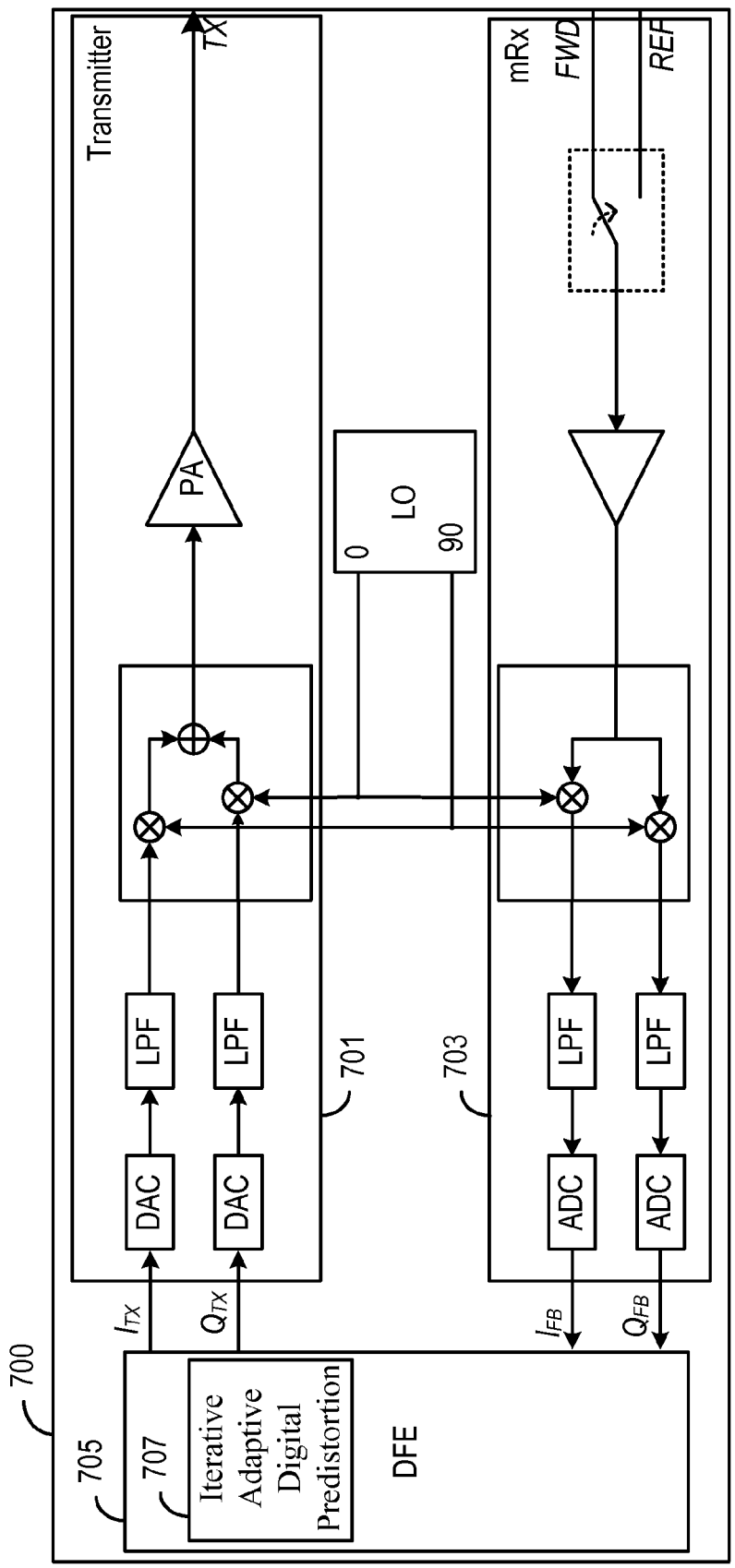
FIG. 7 is a block diagram of equipment that includes a transmitter and a measurement receiver as described earlier.

FIG. 7 is a block diagram of equipment 700 that includes a transmitter 701 and a measurement receiver 703 as described earlier. The transmitter 701 receives baseband I and Q signals from Digital Front End (DFE) circuitry 705, and the measurement receiver 703 supplies its I and Q signals to the DFE circuitry 705.

A digital scaler (depicted in FIG. 8) is used (1) to provide the right signal level to the iterative adaptive lookup table (LUT) and (2) to change the closed-loop gain that will result in an output transmitter power change. Hence, such a closed-loop function is used as a very precise power control.

In this exemplary embodiment, the DFE circuitry 705 includes iterative digital predistortion circuitry 707 that, based on the original (undistorted) signals to be supplied to the transmitter 701 and the signals supplied by the measurement receiver 703, predistorts the original signals and supplies these to the transmitter 701. The predistortion is adapted to compensate for distortion that is introduced by the transmitter 701, so that the signal supplied to the transmitter's antenna is substantially undistorted.

Figure 8:
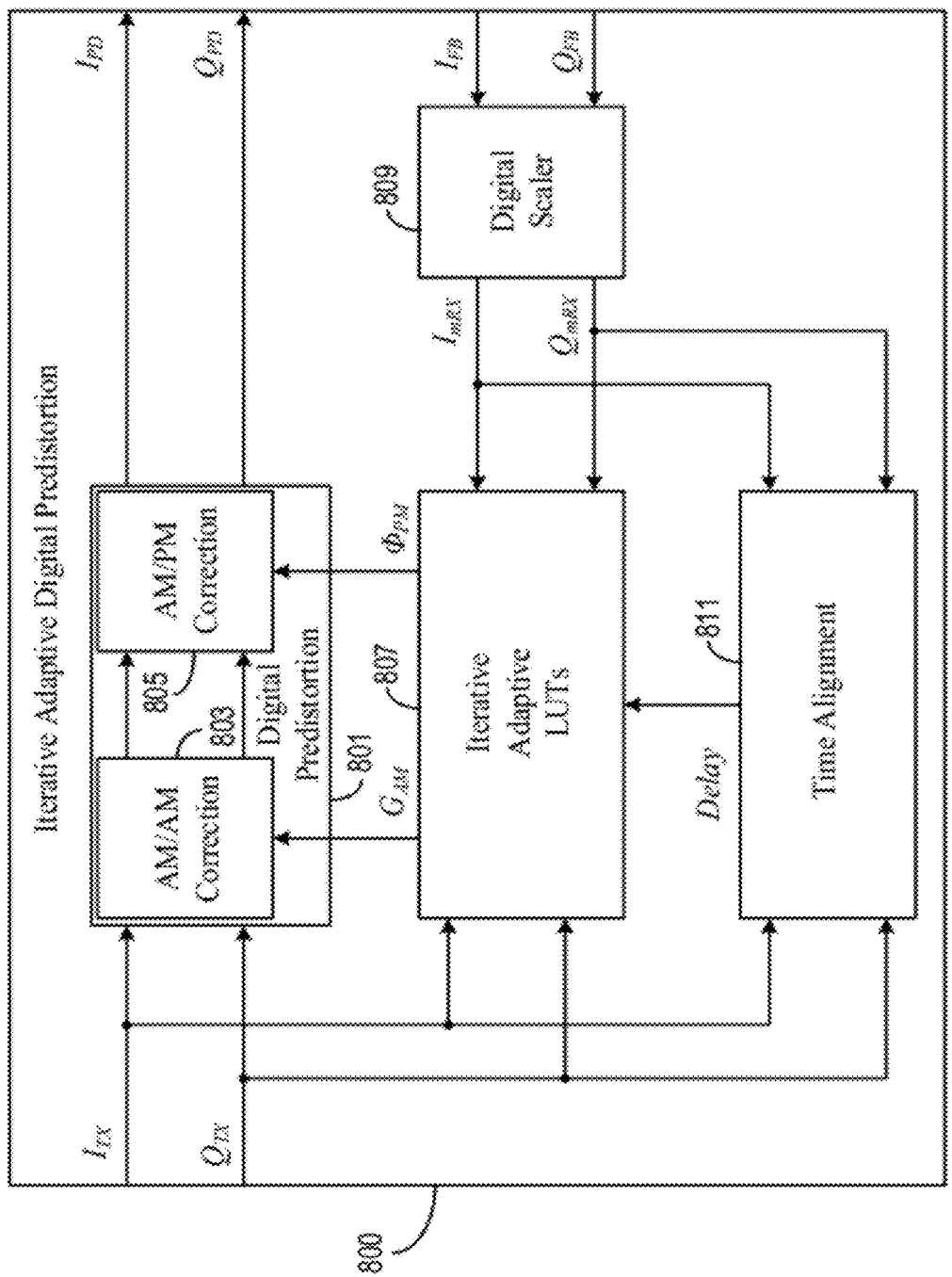
FIG. 8 is a block diagram of exemplary iterative digital predistortion circuitry consistent with aspects of the invention.

FIG. 8 is a block diagram of exemplary iterative digital predistortion circuitry 800 consistent with aspects of the invention. The iterative digital predistortion circuitry 800 comprises:

A digital predistorter 801 comprising an AM/AM Scaler 803, that multiplies the input complex signal for a gain that depends on the input magnitude value, and an AM/PM Rotor 805, that rotates the input complex signal by a phase that depends on the input magnitude value. The pair $(G_{AM}, \Phi_{PM})$ is computed by a set of iterative adaptive LUTs 807 and applied for each sample.

Digital scaling circuitry 809 configured to receive the complex feed-back signal and to 'change' the closed loop gain.

A time alignment unit 811 that computes the actual round trip delay. The round trip delay is preferably estimated by means of the time delay estimation techniques described earlier (e.g., see FIGS. 1-4 and supporting text).

The set of iterative adaptive LUTs 807 (mentioned above), which are described in greater detail below.

Figure 9:
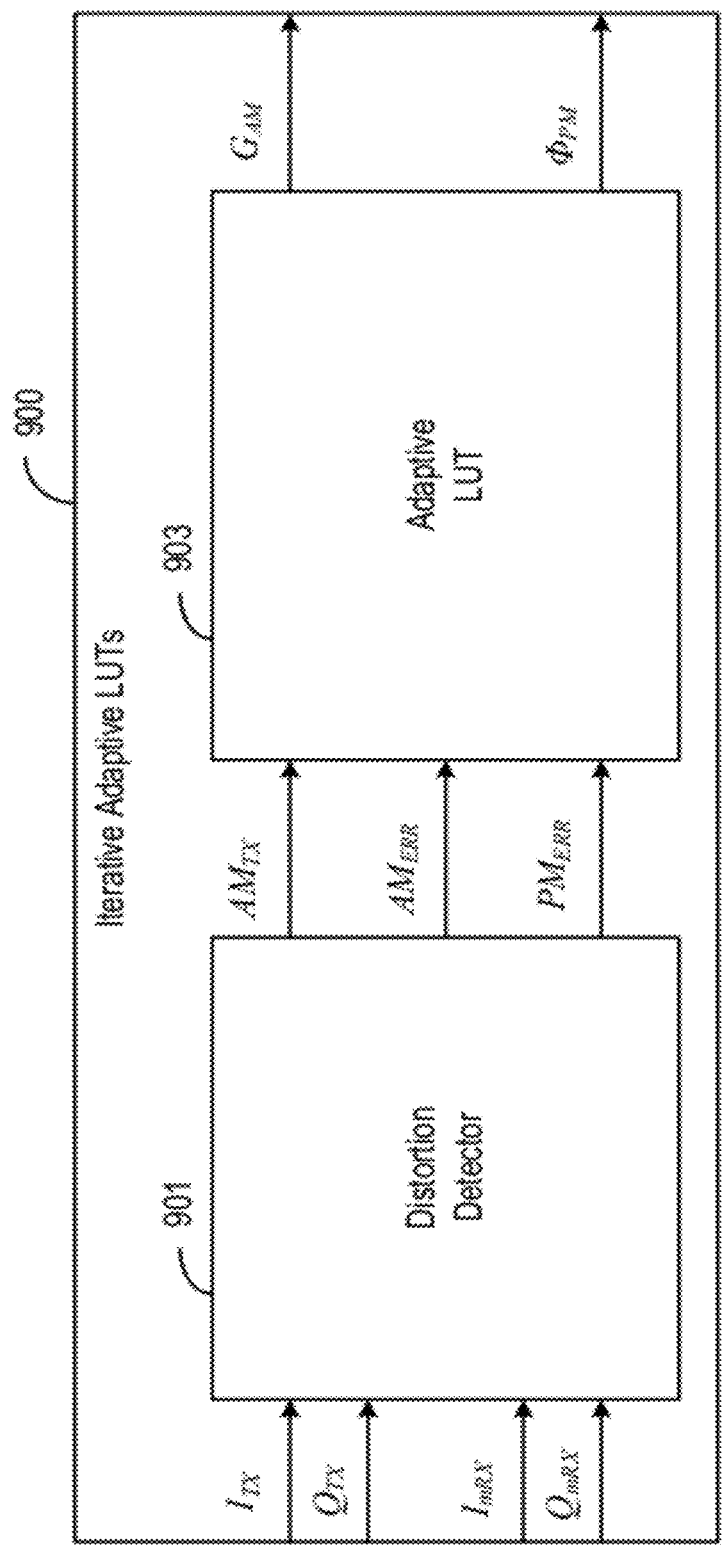
FIG. 9 is a block diagram of an exemplary set of iterative adaptive LUTs, suitable for use in the iterative digital predistortion circuitry of FIG. 8.

FIG. 9 is a block diagram of an exemplary set of iterative adaptive LUTs 900, suitable for use in the iterative digital predistortion circuitry 800 of FIG. 8. The set of iterative adaptive LUTs 900 comprise:

A distortion detector 901 that compares each complex sample of the original signal to be transmitted, ($I_{TX}$, $Q_{TX}$), with each sample of the feed-back/received complex samples, ($I_{mRX}$, $Q_{mRX}$), to produce and supply amplitude error (AMerr) and phase error (PMerr) signals, as well as the amplitude of the original signal to be transmitted, to a set of adaptive LUTs 903. AMerr provides information indicating whether the actual envelope (at the output of the transmitter) has been compressed or amplified relative to the original signal to be transmitted, and PMerr provides information indicating whether the phase of the actual envelope (at the output of the transmitter) has been increased or decreased. The AMerr and PMerr information are the bases upon which adaptations to the contents of the set of adaptive LUTs 903 are made.

The set of adaptive LUTs 903 that comprise an AM-AM Adaptive LUT and an AM-PM Adaptive LUT. The AM-AM and AM-PM adaptive LUTs are quite similar to one another in terms of implementation; each of the adaptive LUTs incorporates a dual-port RAM (dual-cell reading and single-cell writing operations), as will be seen in further detail below.

Figure 10:
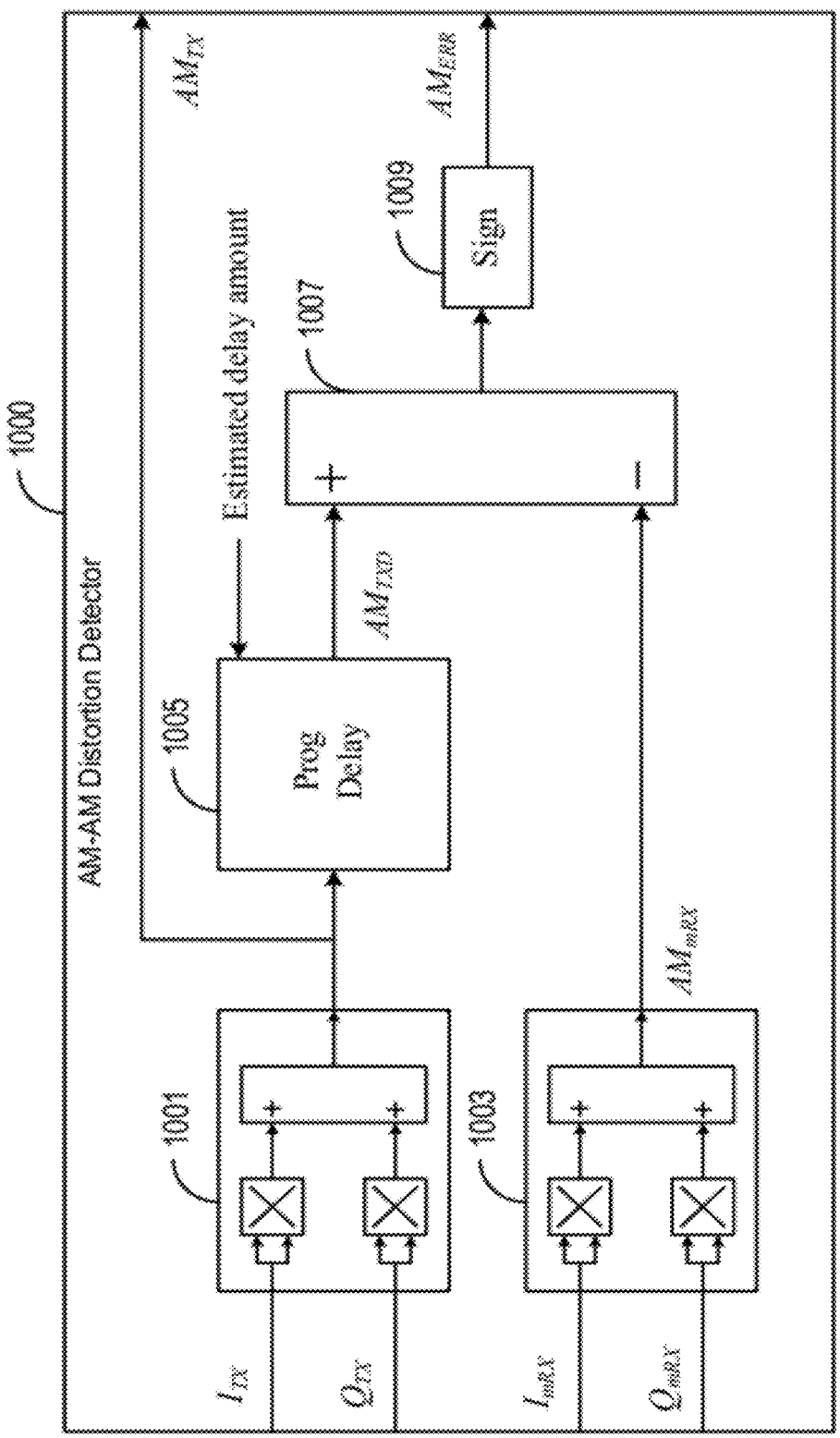
FIG. 10 is a block diagram of an exemplary AM-AM distortion detector.
Figure 11:
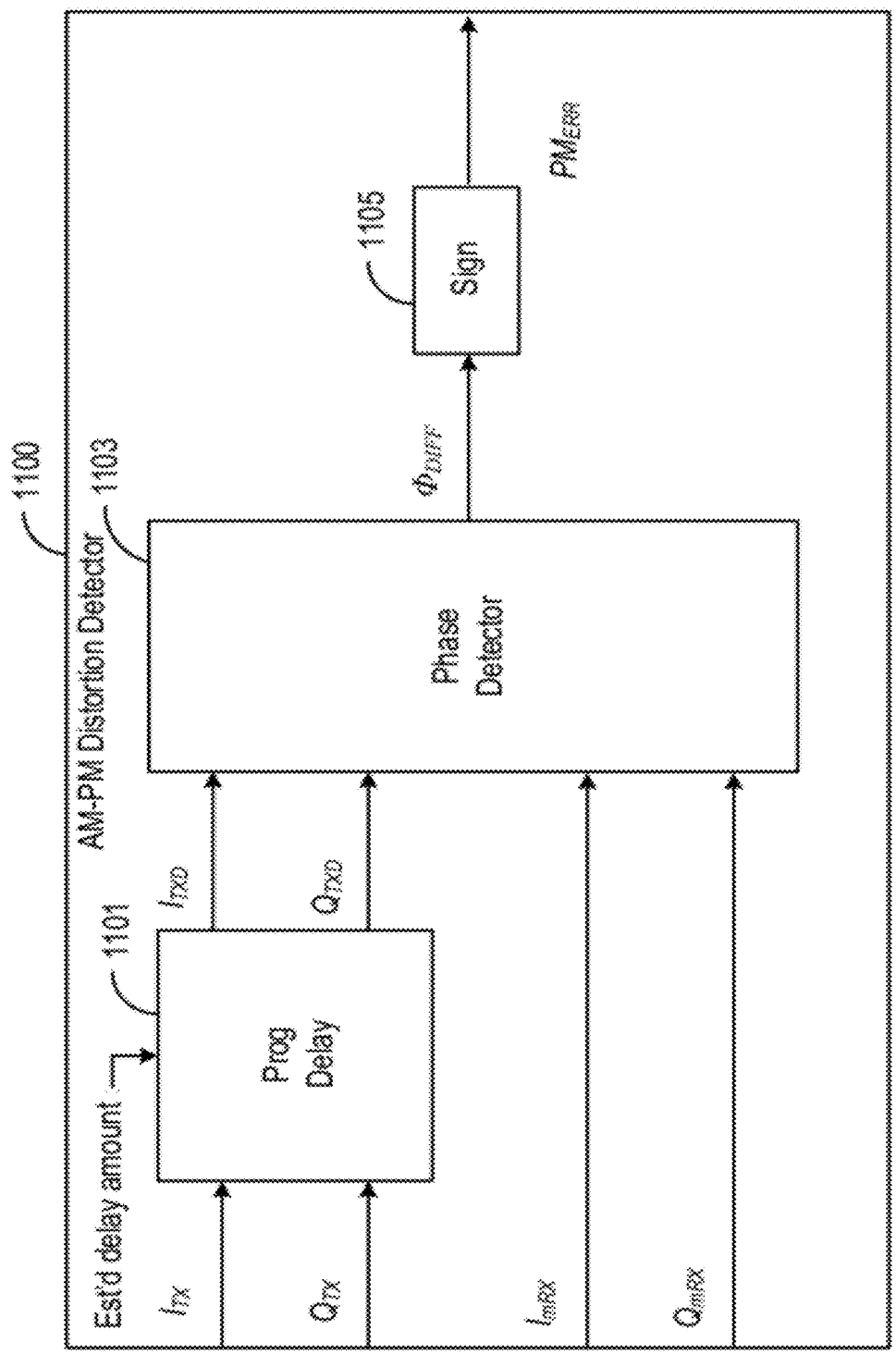
FIG. 11 is a block diagram of an exemplary AM-PM distortion detector.

The distortion detector 901 comprises an AM-AM distortion detector and an AM-PM distortion detector. FIG. 10 is a block diagram of an exemplary AM-AM distortion detector 1000 and FIG. 11 is a block diagram of an exemplary AM-PM distortion detector 1100.

Regarding the AM-AM distortion detector 1000, it computes the squared envelope for both the transmit signal, ($I_{TX}$, $Q_{TX}$) (performed by squared envelope generator 1001), and for the received signal, ($I_{mRX}$, $Q_{mRX}$) (performed by squared envelope generator 1003). In each case, the squared envelope is derived by squaring each of the I and Q signals (two multipliers are used in each squared envelope generator, with each multiplier receiving either the same I signal or the same Q signal) and summing the squared I and Q signals. It is desired to compare the squared envelope of the transmit signal with the squared envelope of the received signal. However, the received signal is delayed relative to the transmit signal, due to delays through the transmitter. To align the signals for comparison, a programmable delay unit 1005 is included that delays the squared envelope of the transmit signal by an amount estimated to be the delay through the transmitter. The estimated delay amount is preferably derived by the methodology described above with reference to FIGS. 1-4.

In the exemplary embodiment, comparison is performed by subtraction circuitry 1007 that subtracts the squared envelope of the received signal from the delayed squared envelope of the transmit signal. The difference, supplied at the output of the subtraction circuitry 1007, is an error signal. The sign of this difference (represented by sign circuitry 1009, although in some but not necessarily all embodiments, obtaining the sign may simply involve using only the sign bit of a multi-bit result) is provided to the AM-AM Adaptive LUT to increase/decrease the values corresponding to the envelope being compared. This is described in further detail below.

Regarding the AM-PM distortion detector 1100, it computes the phase difference between a delayed copy of TX sample and the received sample. The delay is intended to compensate for the delay through the transmitter, and is achieved by means of a programmable delay circuitry 1101. The estimated delay amount is preferably derived by the methodology described above with reference to FIGS. 1-4. Phase difference detection circuitry 1103 accordingly receives the delayed version of the I and Q transmit signals, ($I_{TX}$, $Q_{TX}$), and the (non-delayed) I and Q received signals, ($I_{mRX}$, $Q_{mRX}$).

The sign of this difference (represented by sign circuitry 1105, although in some but not necessarily all embodiments, obtaining the sign may simply involve using only the sign bit of a multi-bit result) is provided to the AM-PM adaptive LUT to increase/decrease the values corresponding to the envelope being compared.

Figure 12:
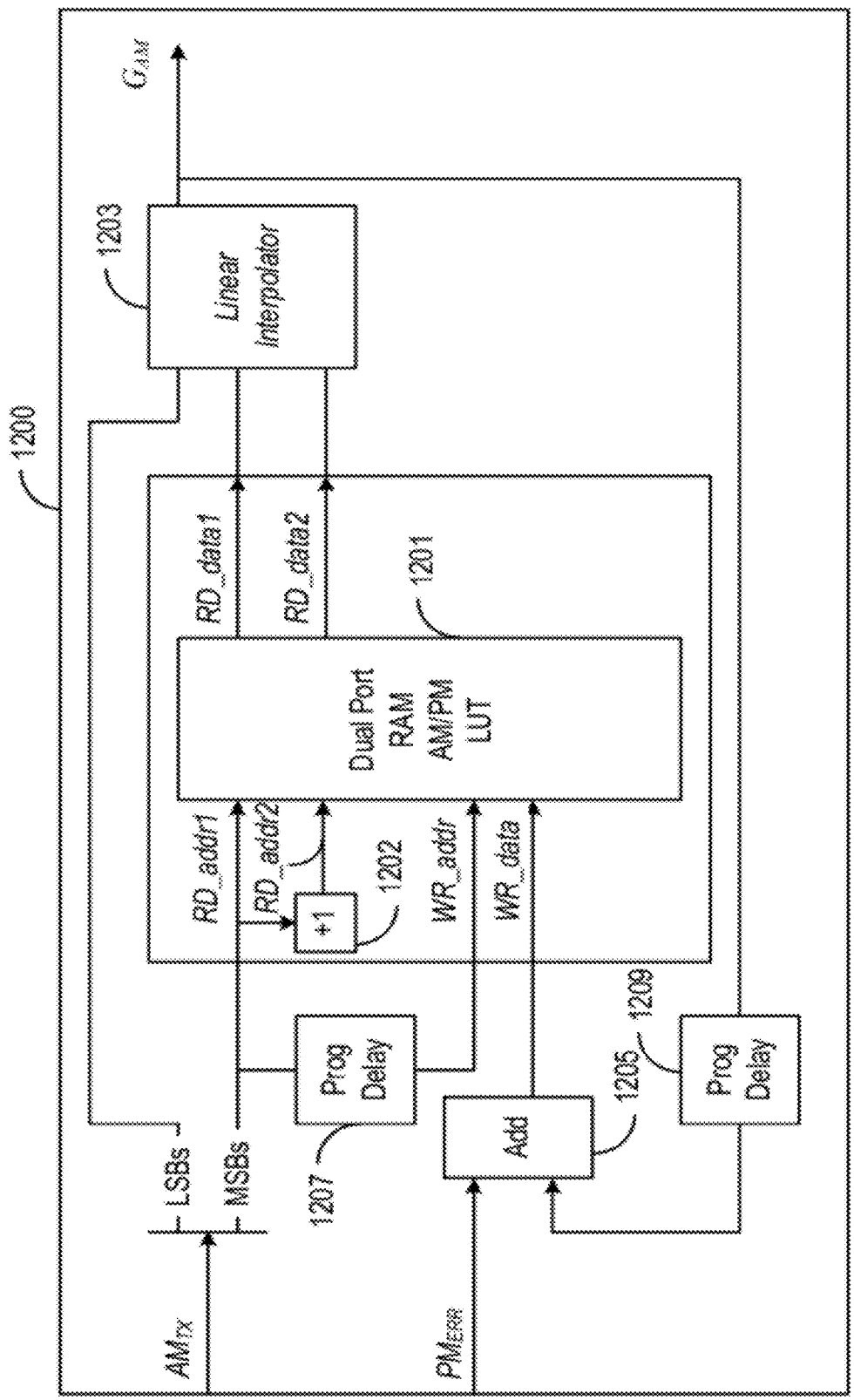
FIG. 12 is a block diagram of an exemplary AM-AM adaptive LUT consistent with the invention.

The AM-AM adaptive LUT and AM-PM adaptive LUT will now be described with reference to FIGS. 12 and 13, respectively. FIG. 12 is a block diagram of an exemplary AM-AM adaptive LUT 1200 consistent with the invention. The AM-AM adaptive LUT 1200 includes a dual port RAM 1201 that provides dual-cell reading and single-cell writing operations. The circuitry is configured so that for each supplied sample, a dual READ/single WRITE access is performed. In some but not necessarily all embodiments, a form of gating can be included for write accesses, but omitting it achieves more stable loop performance. One of the principles of operation of the AM-AM adaptive LUT 1200 is that the amplitude of the transmitted signal should be used to address a corresponding gain amount, $G_{AM}$, that will be used to distort the amplitude of the signal to be transmitted. However, in some implementations, the circuitry is embodied on a die whose area is constrained, thereby limiting the capacity of the RAM. To overcome this limitation in some embodiments, the circuitry is configured such that some number of least significant bits (LSBs) of the amplitude of the transmitted signal are not used to address the dual port RAM 1201. Instead, only the remaining most significant bits (MSBs) are used. This address (RD_addr1) is fed, unchanged, to one Read Address Port of the dual port RAM 1201. The address is also supplied to incrementing circuitry 1202, which adds "1" to the address and supplies this incremented address (RD_addr2) to a second Read Address Port of the dual port RAM 1201. (In alternative embodiments, decrementing circuitry could be used to generate an address of an adjacent memory location.) With this arrangement, the address causes two gain values to be supplied at corresponding outputs of the dual port RAM 1201, the two values being the values stored at adjacent locations within the dual port RAM 1201. A linear interpolator 1203 receives these values and, using a weight determined by the LSBs of the amplitude of the transmitted signal, generates and supplies an interpolated value that is used as the gain amount, G.

Adaptation of the LUT involves feeding back the gain amount, $G_{AM}$, and adding it (by means of an adding circuit 1205) to the amplitude error amount, $AM_{ERR}$ (which is just a sign value). This will cause adaptation to take place by incremental amounts. It will be appreciated that the values that are updated are identified by an address that was used N samples before, where N is the delay in sample clock periods. Accordingly, the MSBs of the amplitude of the transmitted signal are delayed by a programmable delay unit 1207 for supplying the write address to the RAM 1201, and the output of the gain amount, $G_{AM}$, is similarly delayed by a programmable delay unit 1209 prior to its being supplied to the adding circuit 1205.

It will be further appreciated that by updating a single address within the dual port RAM 1201, and keeping in mind the fact that for each address, two locations are accessed for interpolation (i.e., the location specified by the address and an adjacent location within the dual port RAM 1201, such as the location identified by address plus 1) two ranges are updated: the range spanning address through address+1, and also the range spanning address−1 through address. The range of the two read values correspondingly affects the interpolated value.

Figure 13:
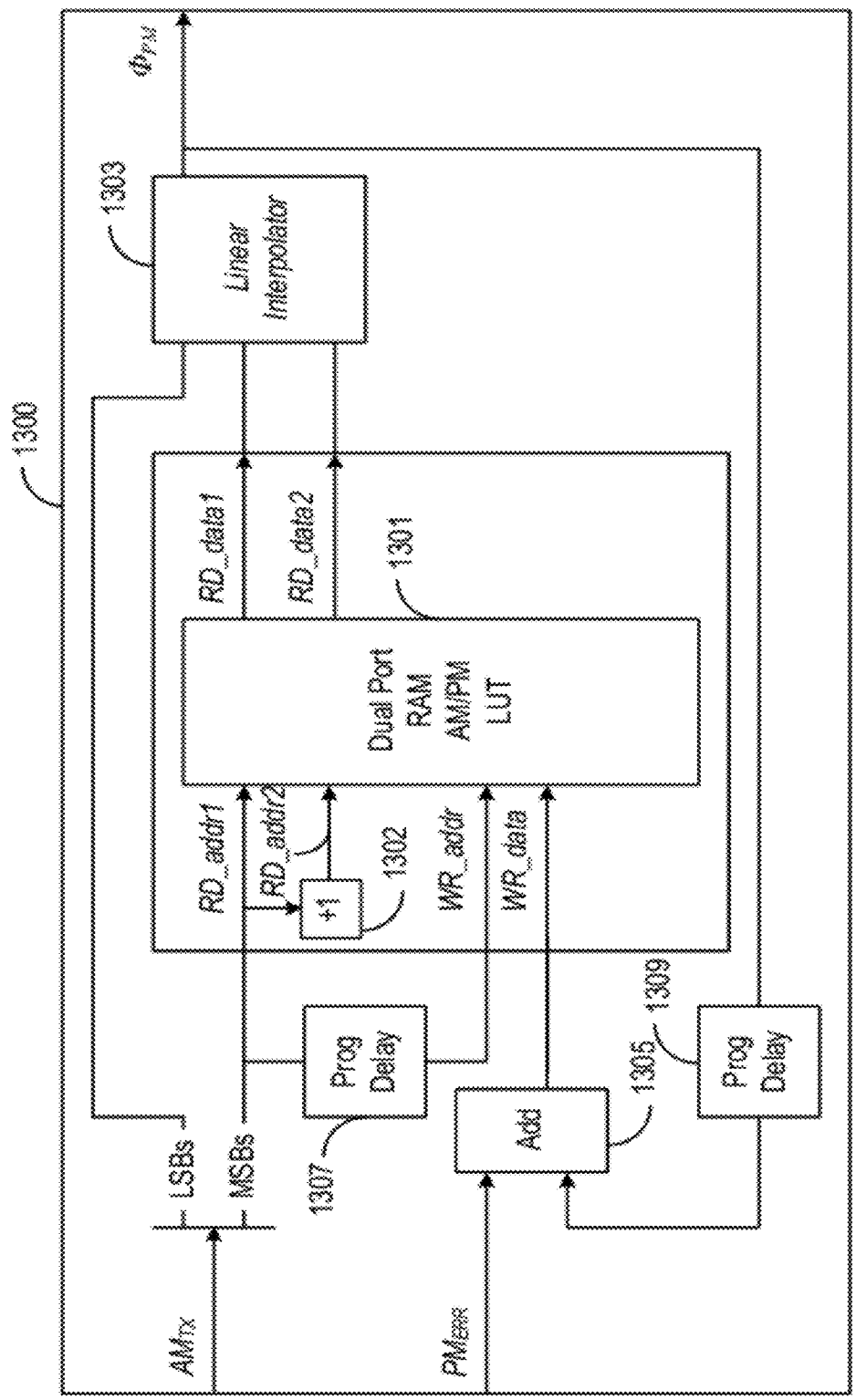
FIG. 13 is a block diagram of an exemplary AM-PM adaptive LUT consistent with the invention.

The AM-PM adaptive LUT 1300, an exemplary embodiment of which is shown in FIG. 13, operates in a similar manner as the AM-PM adaptive LUT 1200, but generates phase correction amounts instead of gain amounts, G. Accordingly, the AM-PM adaptive LUT 1300 includes a dual port RAM 1301 that provides dual-cell reading and single-cell writing operations. The circuitry is configured so that for each supplied sample, a dual READ/single WRITE access is performed. In some but not necessarily all embodiments, a form of gating can be included for write accesses, but omitting it achieves more stable loop performance. One of the principles of operation of the PM-AM adaptive LUT 1300 is that the amplitude of the transmitted signal should be used to address a corresponding phase amount, $\Phi_{PM}$, that will be used to distort the phase of the signal to be transmitted. However, in some implementations, the circuitry is embodied on a die whose area is constrained, thereby limiting the capacity of the RAM. To overcome this limitation in some embodiments, the circuitry is configured such that some number of least significant bits (LSBs) of the amplitude of the transmitted signal are not used to address the dual port RAM 1301. Instead, only the remaining most significant bits (MSBs) are used. This address (RD_addr1) is fed, unchanged, to one Read Address Port of the dual port RAM 1301. The address is also supplied to incrementing circuitry 1302, which adds "1" to the address and supplies this incremented address (RD_addr2) to a second Read Address Port of the dual port RAM 1301. (In alternative embodiments, decrementing circuitry could be used to generate an address of an adjacent memory location.) With this arrangement, the address causes two phase values to be supplied at corresponding outputs of the dual port RAM 1301, the two values being the values stored at adjacent locations within the dual port RAM 1301. A linear interpolator 1303 receives these values and, using a weight determined by the LSBs of the amplitude of the transmitted signal, generates and supplies an interpolated value that is used as the phase amount, $\Phi_{PM}$.

Adaptation of the LUT involves feeding back the phase amount, $\Phi_{PM}$, and adding it (by means of an adding circuit 1305) to the phase error amount, $PM_{ERR}$ (which is just a sign value). This will cause adaptation to take place by incremental amounts. It will be appreciated that the values that are updated are identified by an address that was used N samples before, where N is the delay in sample clock periods. Accordingly, the MSBs of the amplitude of the transmitted signal are delayed by a programmable delay unit 1307 for supplying the write address to the RAM 1301, and the output of the phase amount, $\Phi_{PM}$, is similarly delayed by a programmable delay unit 1309 prior to its being supplied to the adding circuit 1305.

It will be further appreciated that by updating a single address within the dual port RAM 1301, and keeping in mind the fact that for each address, two locations are accessed for interpolation (i.e., the location specified by the address and an adjacent location within the dual port RAM 1201, such as the location identified by address plus 1) two ranges are updated: the range spanning address through address+1, and also the range spanning address−1 through address. The range of the two read values correspondingly affects the interpolated value.

With the arrangement as described above, no absolute computation is performed to get the precise gain and phase values. Consequently, a characteristic of the arrangement is that the non-linearity compensation takes some time to converge to final values. In another aspect of embodiments consistent with some but not necessarily all embodiments the invention, a time-varying and envelope-dependent weight can be used to speed up the convergence time. In practice, one can use the difference to get a better correction value depending on the difference value.

Figure 14:
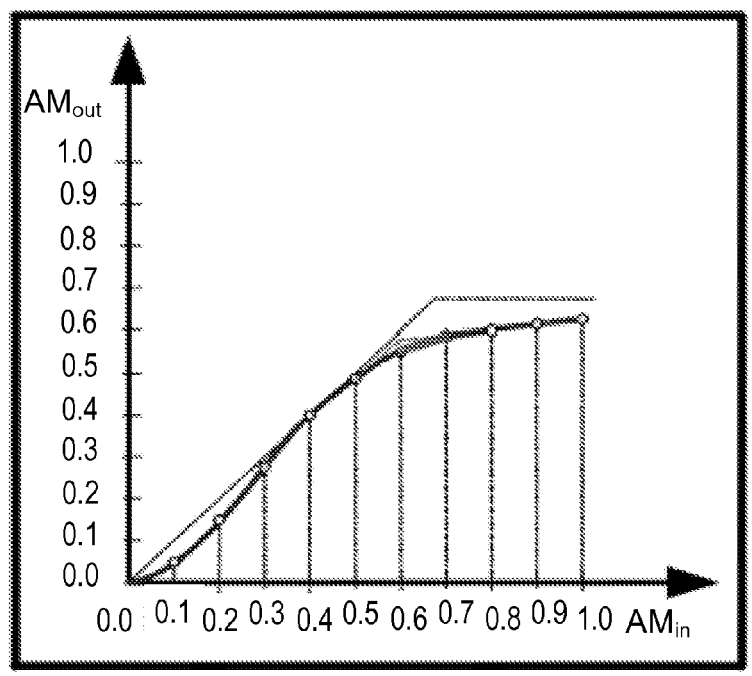
FIG. 14 is a graph depicting AM/AM correction (amplitude out plotted as a function of amplitude in) that is achievable by some embodiments consistent with the invention.
Figure 15:
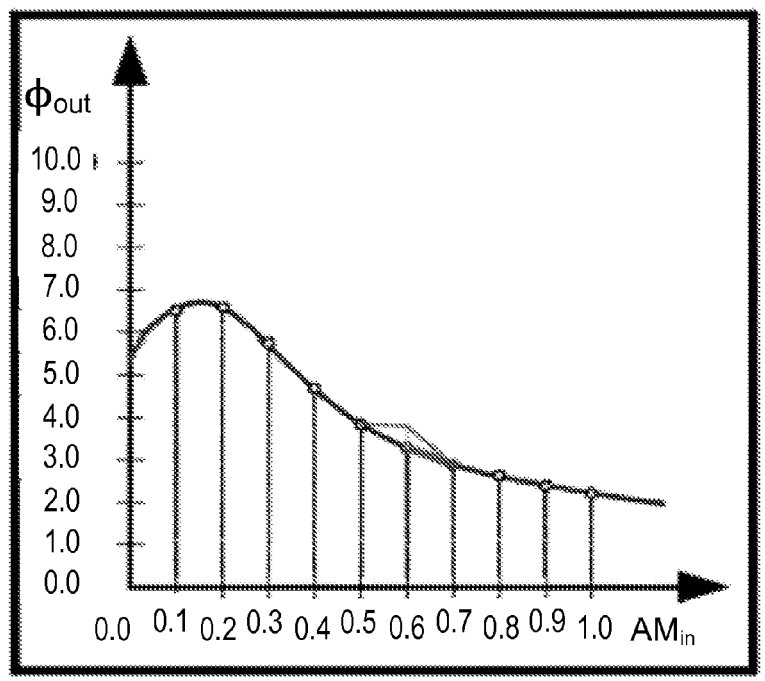
FIG. 15 is a graph depicting AM/PM correction (phase out plotted as a function of amplitude in) that is achievable by some embodiments consistent with the invention.

FIG. 14 is a graph depicting AM/AM correction and FIG. 15 is a graph depicting AM/PM correction, both being achievable by some embodiments consistent with the invention. More specifically, FIG. 14 is a graph depicting output amplitude (output envelope) as a function of input amplitude (input envelope), and FIG. 15 is a graph depicting output phase as a function of input amplitude (input envelope). To speed the convergence time, if the actual envelope of the sample falls within a given sub-interval, for example [0.6, 0.7), then the gain, phase pair for 0.6 is updated by a small quantity (positive/decrease) depending on the feed-back error. As a linear interpolator is used to get the final value, the interval [0.5,0.7) is automatically modified because of the linear interpolation.

The LUT should be addressed by the signal envelope or any univocal envelope dependent parameter. In the exemplary embodiments, the squared envelope was chosen to address the table. A linear resolution on the squared envelope translates into a variable resolution on the envelope. The quadratic law allows having better resolution for high envelope values while reduced resolution where noise can dominate (low envelope values). The best way to get the (gain, phase) pair is to perform a complex division between the reference signal and the feed-back one and then to average the results. However, as explained earlier, having to perform a complex division imposes a large processing/hardware overhead on implementations. The present invention proposes to avoid the complex division by using an iterative and seamless approach to minimize the computation cost.

The time delay estimation techniques described earlier are advantageously used to provide values for the programmable delays that align signals for comparison. The delay value can be stored and applied accordingly.

The various ones of the above-described embodiments for achieving predistortion are advantageous in that they eliminate the complexity associated with having to perform a complex computation to get the correct (gain, phase) pair. In addition, they eliminate the need to use 'pre-defined' signals to determine the predistortion; they can instead be used with modulated signals during the life-time of the device.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of measuring an amount of delay between a digital reference signal and a digital derived signal, wherein the derived signal is derived from the reference signal, the method comprising:
    operating an apparatus that measures the amount of delay by:
    ascertaining a sign of a slope of the derived signal over a first time interval;
    producing a set of time-associated reference signs by ascertaining a sign of a slope of the reference signal over each of a plurality of different time intervals leading up to the first time interval;
    producing a first set of coincidence results by detecting coincidence between the sign of the slope of the derived signal and each one of the time-associated reference signs in the set of time-associated reference signs; and
    using the first set of coincidence results alone or in combination with other coincidence results as an indicator of the amount of delay between the reference signal and the derived signal.

2. The method of claim 1, comprising:
    producing one or more additional sets of coincidence results by, for each one of one or more different time intervals:
        ascertaining a sign of a slope of the derived signal over the different time interval; and
        producing an additional set of time-associated reference signs by ascertaining a sign of a slope of the reference signal over each of a plurality of different time intervals leading up to the different time interval,
    wherein the step of using the first set of coincidence results alone or in combination with other coincidence results as the indicator of the amount of delay between the reference signal and the derived signal comprises using the first set of coincidence results in combination with the one or more additional sets of coincidence results as the indicator of the amount of delay between the reference signal and the derived signal.

3. The method of claim 2, wherein using the first set of coincidence results in combination with the one or more additional sets of coincidence results as the indicator of the amount of delay between the reference signal and the derived signal comprises:
    combining each coincidence result in the first set of coincidence results with a respective one of the coincidence results from each of the one or more additional sets of coincidence results to produce a combined set of coincidence results; and
    using the combined set of coincidence results as the indicator of the amount of delay between the reference signal and the derived signal.

4. The method of claim 3, wherein using the combined set of coincidence results as the indicator of the amount of delay between the reference signal and the derived signal comprises:
    identifying which element of the combined set of coincidence results has a minimum value; and
    using the identified element's position within the combined set of coincidence results as an indicator of the amount of delay between the digital reference signal and the digital derived signal.

5. The method of claim 1, wherein using the first set of coincidence results alone or in combination with other coincidence results as the indicator of the amount of delay between the reference signal and the derived signal comprises:
    identifying which element of the first set of coincidence results has a minimum value; and
    using the identified element's position within the first set of coincidence results as an indicator of the amount of delay between the digital reference signal and the digital derived signal.

6. The method of claim 1, wherein producing the set of time-associated reference signs by ascertaining the sign of the slope of the reference signal over each of the plurality of different time intervals leading up to the first time interval comprises:
    supplying the sign of the slope of the reference signal associated with the first time interval to an input port of a bank of N series-connected delay units and clocking the bank of delay units at a known clock rate, wherein N is greater than 1.

7. The method of claim 6, wherein producing the first set of coincidence results by detecting coincidence between the sign of the slope of the derived signal and each one of the time-associated reference signs in the set of time-associated reference signs comprises:
    supplying an output of each delay unit within the bank of delay units to one input of a respective one of a plurality of comparison units; and
    supplying the sign of the slope of the derived signal to another input of each of the plurality of comparison units.

8. The method of claim 7, wherein one or more of the comparison units is/are an XOR gate.

9. The method of claim 7, wherein using the first set of coincidence results alone or in combination with other coincidence results as the indicator of the amount of delay between the reference signal and the derived signal comprises:
    supplying an output of each of the comparison units to a respective one of a plurality of counters;
    clocking each of the counters at the known clock rate; and
    ascertaining which of the counters is storing a lowest count value.

10. The method of claim 1, wherein:
    the digital reference signal is a baseband signal that is supplied for use by a radio transmitter; and
    the digital derived signal is produced by:
        producing in-phase and quadrature phase digital baseband output signals from a radiofrequency signal that is present at an output port of the radio transmitter.

11. The method of claim 10, wherein the output port is an antenna.

12. The method of claim 10, wherein ascertaining the sign of the slope of the derived signal over the first time interval comprises:
    squaring an envelope of the in-phase and quadrature phase digital baseband output signals;
    obtaining a difference value by subtracting the squared envelope of the in-phase and quadrature phase digital baseband output signals from an earlier-obtained squared envelope of the in-phase and quadrature phase digital baseband output signals; and
    ascertaining the sign of the difference value.

13. The method of claim 10, comprising:
    supplying the digital reference signal to an input port of a reference signal delay unit, wherein the reference signal delay unit supplies a delayed reference signal at an output port;

using the amount of delay between the digital reference signal and the digital derived signal to control the reference signal delay unit; and comparing the delayed reference signal with the digital derived signal, and using a result of the comparison to control an aspect of the radio transmitter operation.

14. The method of claim 13, wherein using the result of the comparison to control the aspect of the radio transmitter operation includes controlling predistortion that is applied to the radio transmitter's input signal.

15. The method of claim 1, wherein the derived signal comprises an in-phase signal and a quadrature phase signal, and where ascertaining the sign of the slope of the derived signal over the first time interval comprises:

generating a squared envelope signal from the in-phase and quadrature phase signals;

ascertaining a difference between a first sample of the squared envelope signal and a second sample of the squared envelope signal, wherein the first sample of the squared envelope signal occurs at a beginning of the first time interval and the second sample of the squared envelope signal occurs at an end of the first time interval; and ascertaining a sign of the difference between the first sample of the squared envelope signal and the second sample of the squared envelope signal.

16. The method of claim 15, wherein the first sample of the squared envelope signal and the second sample of the squared envelope signal are adjacent samples of the squared envelope signal.

17. The method of claim 1, wherein the derived signal comprises an in-phase signal and a quadrature phase signal, and where ascertaining the sign of the slope of the derived signal over the first time interval comprises:

generating an envelope signal from the in-phase and quadrature phase signals;

ascertaining a difference between a first sample of the envelope signal and a second sample of the envelope signal, wherein the first sample of the envelope signal occurs at a beginning of the first time interval and the second sample of the envelope signal occurs at an end of the first time interval; and ascertaining a sign of the difference between the first sample of the envelope signal and the second sample of the envelope signal.

18. The method of claim 17, wherein the first sample of the envelope signal and the second sample of the envelope signal are adjacent samples of the envelope signal.

19. An apparatus for measuring an amount of delay between a digital reference signal and a digital derived signal, wherein the derived signal is derived from the reference signal, the apparatus comprising:

circuitry configured to ascertain a sign of a slope of the derived signal over a first time interval;

circuitry configured to produce a set of time-associated reference signs by ascertaining a sign of a slope of the reference signal over each of a plurality of different time intervals leading up to the first time interval;

circuitry configured to produce a first set of coincidence results by detecting coincidence between the sign of the slope of the derived signal and each one of the time-associated reference signs in the set of time-associated reference signs; and circuitry configured to use the first set of coincidence results alone or in combination with other coincidence results as an indicator of the amount of delay between the reference signal and the derived signal.

20. The apparatus of claim 19, wherein the apparatus is configured to:

produce one or more additional sets of coincidence results by, for each one of one or more different time intervals:
ascertaining a sign of a slope of the derived signal over the different time interval; and
producing an additional set of time-associated reference signs by ascertaining a sign of a slope of the reference signal over each of a plurality of different time intervals leading up to the different time interval, wherein the circuitry configured to use the first set of coincidence results alone or in combination with other coincidence results as the indicator of the amount of delay between the reference signal and the derived signal is configured to use the first set of coincidence results in combination with the one or more additional sets of coincidence results as the indicator of the amount of delay between the reference signal and the derived signal.

21. The apparatus of claim 20, wherein the circuitry configured to use the first set of coincidence results in combination with the one or more additional sets of coincidence results as the indicator of the amount of delay between the reference signal and the derived signal is configured to:

combine each coincidence result in the first set of coincidence results with a respective one of the coincidence results from each of the one or more additional sets of coincidence results to produce a combined set of coincidence results; and use the combined set of coincidence results as the indicator of the amount of delay between the reference signal and the derived signal.

22. The apparatus of claim 21, wherein in order to use the combined set of coincidence results as the indicator of the amount of delay between the reference signal and the derived signal, the circuitry configured to use the first set of coincidence results in combination with the one or more additional sets of coincidence results as the indicator of the amount of delay between the reference signal and the derived signal is configured to:

identify which element of the combined set of coincidence results has a minimum value; and use the identified element's position within the combined set of coincidence results as an indicator of the amount of delay between the digital reference signal and the digital derived signal.

23. The apparatus of claim 19, wherein the circuitry configured to use the first set of coincidence results alone or in combination with other coincidence results as the indicator of the amount of delay between the reference signal and the derived signal is configured to:

identify which element of the first set of coincidence results has a minimum value; and use the identified element's position within the first set of coincidence results as an indicator of the amount of delay between the digital reference signal and the digital derived signal.

24. The apparatus of claim 19, wherein the circuitry configured to produce the set of time-associated reference signs by ascertaining the sign of the slope of the reference signal over each of the plurality of different time intervals leading up to the first time interval is configured to:

supply the sign of the slope of the reference signal associated with the first time interval to an input port of a bank of N series-connected delay units and to clock the bank of delay units at a known clock rate, wherein N is greater than 1.

25. The apparatus of claim 24, wherein the circuitry configured to produce the first set of coincidence results by detecting coincidence between the sign of the slope of the derived signal and each one of the time-associated reference signs in the set of time-associated reference signs is configured to:
- supply an output of each delay unit within the bank of delay units to one input of a respective one of a plurality of comparison units; and
- supply the sign of the slope of the derived signal to another input of each of the plurality of comparison units.

26. The apparatus of claim 25, wherein one or more of the comparison units is/are an XOR gate.

27. The apparatus of claim 25, wherein the circuitry configured to use the first set of coincidence results alone or in combination with other coincidence results as the indicator of the amount of delay between the reference signal and the derived signal is configured to:
- supply an output of each of the comparison units to a respective one of a plurality of counters;
- clock each of the counters at the known clock rate; and
- ascertain which of the counters is storing a lowest count value.

28. The apparatus of claim 19, wherein:
- the apparatus is coupled for use with a radio transmitter;
- the digital reference signal is a baseband signal that is supplied for use by the radio transmitter; and
- the radio transmitter produces the digital derived signal by:
  - producing in-phase and quadrature phase digital baseband output signals from a radiofrequency signal that is present at an output port of the radio transmitter.

29. The apparatus of claim 28, wherein the output port is an antenna.

30. The apparatus of claim 28, wherein the circuitry configured to ascertain the sign of the slope of the derived signal over the first time interval is configured to:
- square an envelope of the in-phase and quadrature phase digital baseband output signals;
- obtain a difference value by subtracting the squared envelope of the in-phase and quadrature phase digital baseband output signals from an earlier-obtained squared envelope of the in-phase and quadrature phase digital baseband output signals; and
- ascertain the sign of the difference value.

31. The apparatus of claim 28, wherein the apparatus is configured to:
- supply the digital reference signal to an input port of a reference signal delay unit, wherein the reference signal delay unit supplies a delayed reference signal at an output port;
- use the amount of delay between the digital reference signal and the digital derived signal to control the reference signal delay unit; and
- compare the delayed reference signal with the digital derived signal, and use a result of the comparison to control an aspect of the radio transmitter operation.

32. The apparatus of claim 31, wherein, in order to use the result of the comparison to control the aspect of the radio transmitter operation, the apparatus is configured to control predistortion that is applied to the radio transmitter's input signal.

33. The apparatus of claim 19, wherein the derived signal comprises an in-phase signal and a quadrature phase signal, and where the circuitry configured to ascertain the sign of the slope of the derived signal over the first time interval comprises:
- circuitry configured to generate a squared envelope signal from the in-phase and quadrature phase signals;
- circuitry configured to ascertain a difference between a first sample of the squared envelope signal and a second sample of the squared envelope signal, wherein the first sample of the squared envelope signal occurs at a beginning of the first time interval and the second sample of the squared envelope signal occurs at an end of the first time interval; and
- circuitry configured to ascertain a sign of the difference between the first sample of the squared envelope signal and the second sample of the squared envelope signal.

34. The apparatus of claim 33, wherein the first sample of the squared envelope signal and the second sample of the squared envelope signal are adjacent samples of the squared envelope signal.

35. The apparatus of claim 19, wherein the derived signal comprises an in-phase signal and a quadrature phase signal, and where the circuitry configured to ascertain the sign of the slope of the derived signal over the first time interval comprises:
- circuitry configured to generate an envelope signal from the in-phase and quadrature phase signals;
- circuitry configured to ascertain a difference between a first sample of the envelope signal and a second sample of the envelope signal, wherein the first sample of the envelope signal occurs at a beginning of the first time interval and the second sample of the envelope signal occurs at an end of the first time interval; and
- circuitry configured to ascertain a sign of the difference between the first sample of the envelope signal and the second sample of the envelope signal.

36. The apparatus of claim 35, wherein the first sample of the envelope signal and the second sample of the envelope signal are adjacent samples of the envelope signal.

* * * * *